United States Patent [19]

Güttinger

[11] Patent Number: 4,620,348
[45] Date of Patent: Nov. 4, 1986

[54] CONTROLLED DEFLECTION ROLL

[75] Inventor: Heinz Güttinger, Schaffhausen, Switzerland

[73] Assignee: Sulzer-Escher Wyss Aktiengesellschaft, Zürich, Switzerland

[21] Appl. No.: 408,694

[22] Filed: Aug. 16, 1982

[30] Foreign Application Priority Data

Sep. 21, 1981 [CH] Switzerland ............... 6072/81

[51] Int. Cl.[4] .................................. B21B 13/02
[52] U.S. Cl. ................................. 29/116 AD
[58] Field of Search ...... 29/116 AD, 113 AD, 116 R, 29/113 R, 110; 100/162 B

[56] References Cited

U.S. PATENT DOCUMENTS 2,691,339 10/1954 Edwards ........................ 100/170
4,069,569 1/1978 Meckel et al. ............... 29/116 AD
4,213,232 7/1980 Biondetti et al. ........... 29/116 AD
4,307,501 12/1981 Ahrweiler ................. 29/116 AD X
4,399,747 8/1983 Schiel et al. .............. 29/116 AD X
4,414,890 11/1983 Schiel et al. ................ 100/162 B Primary Examiner—Howard N. Goldberg
Assistant Examiner—Timothy V. Eley
Attorney, Agent, or Firm—Werner W. Kleeman

[57] ABSTRACT

A controlled deflection roll contains a stationary roll support or beam and a roll shell or jacket rotatable about the stationary roll support. The rotatable roll shell is supported upon the stationary roll support by means of hydrostatic support or pressure elements. The roll shell is displaceably guided in guides in relation to the stationary roll support for movement in a press or pressure plane. Between the rotatable roll shell and the stationary roll support there are arranged supporting or carrier members which are suitable for taking-up the inherent weight of the rotatable roll shell within the range of mobility of the rotatable roll shell in relation to the stationary roll support or beam.

11 Claims, 9 Drawing Figures

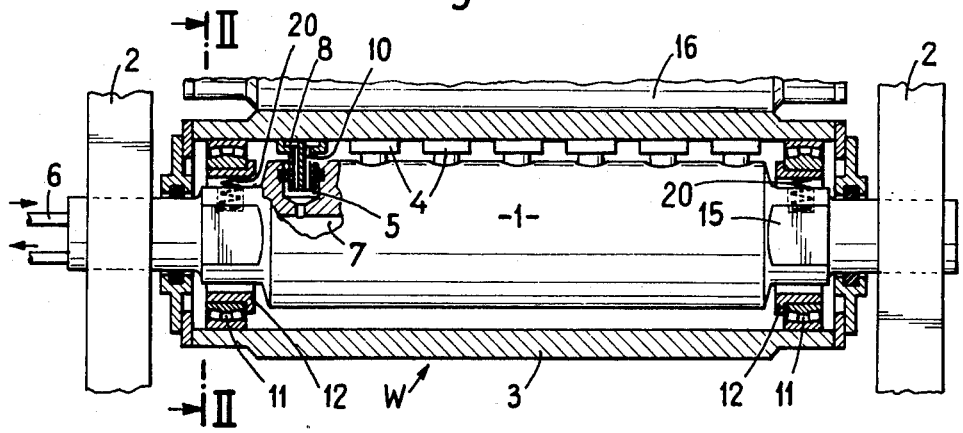
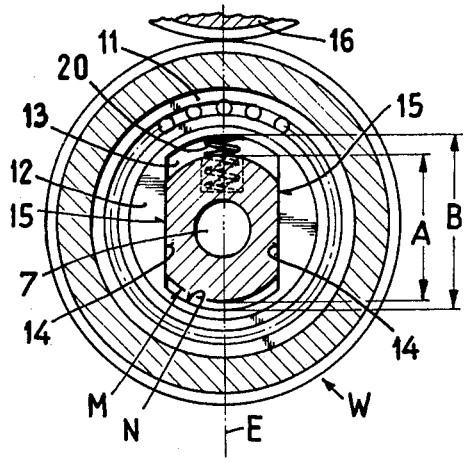
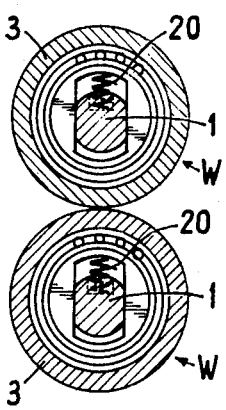
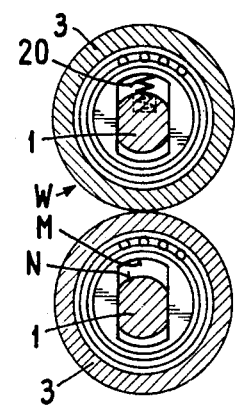
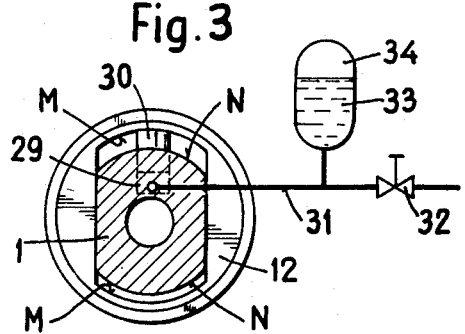
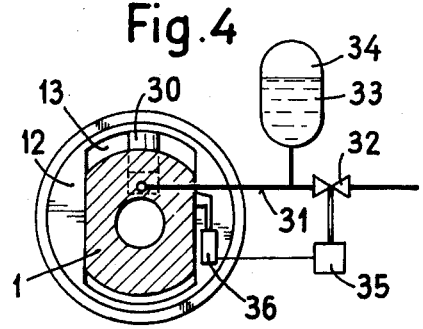

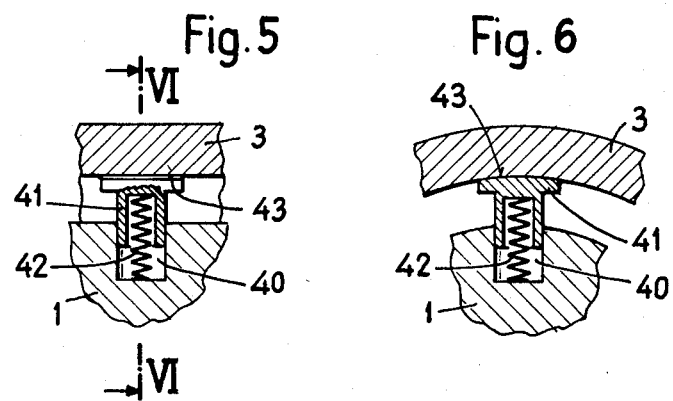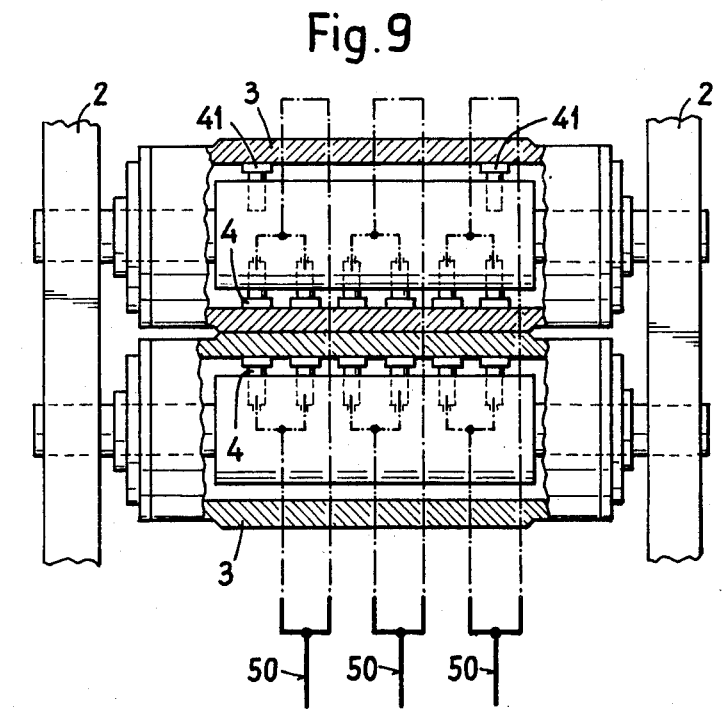

1

CONTROLLED DEFLECTION ROLL

BACKGROUND OF THE INVENTION

The present invention relates to a new and improved construction of a controlled deflection roll—also referred to in the art as a roll with bending or sag compensation—containing a stationary roll support or beam and a roll shell rotatable about said stationary roll support, wherein the rotatable roll shell is supported upon the stationary roll support by means of support or pressure elements and can be displaced relative to the stationary roll support in a press or pressure plane within a predetermined mobility range.

Such type of controlled deflection roll is known to the art, for instance, from U.S. Pat. No. 3,885,283, granted May 27, 1975. The support or pressure elements which are used with such prior art construction of controlled deflection roll are known from U.S. Pat. No. 3,802,044, granted Apr. 9, 1974. However, it is to be understood that also many other different types of support or pressure elements can be beneficially employed with such type of controlled deflection roll.

There have also been already proposed and constructed rolling mills or equipment, for instance calenders, wherein two such type of controlled deflection rolls press towards one another, and between such controlled deflection rolls there can be located further standard rolls. Such type of rolling mills manifest themselves by a heretofore hardly attainable uniformity of the pressing force over their width, even if, however, such is realised at the expense of providing for the equipment a relatively complicated regulation system since it is necessary to compensate the inherent weight throughout the entire length of the roll.

SUMMARY OF THE INVENTION

Therefore, with the foregoing in mind it is a primary object of the present invention to provide a new and improved construction of a controlled deflection roll which appreciably simplifies the construction of rolling mills in that, during the regulation of the pressing forces of mutually oppositely effective support elements it is no longer necessary to take into account the inherent weight of the roll shell and the movable parts.

Another and more specific object of the present invention is directed to a new and improved construction of a controlled deflection roll which is relatively simple in construction and design, extremely economical to manufacture, highly reliable in operation, not readily subject to breakdown or malfunction, requires a minimum of maintenance and servicing, and can be beneficially used in rolling mills or similar equipment without the need for complicated regulation systems since the controlled deflection roll is provided with means which enable eliminating the inherent weight of the roll shell and the movable parts.

Now in order to implement these and still further objects of the invention, which will become more readily apparent as the description proceeds, the controlled deflection roll of the present development is manifested by the features that, there are provided supporting or carrier members which are interposed between the stationary roll support or beam and the rotatable roll shell. These supporting or carrier members are suitable for taking-up the inherent weight of the roll shell and possible parts moving in conjunction with the roll shell throughout the mobility region of the roll shell in relation to the stationary roll support.

With such type of construction of controlled deflection roll the weight of the roll shell and the possible parts effective by the action of their weight upon the roll shell, for instance the support or pressure elements, are taken-up by the supporting or carrier members, so that the regulation equipment for the formation of the pressing force in a calender only has to act upon the support elements, and specifically, in the same sense with two rolls mutually pressing against one another with pairs of coacting support elements.

According to an extremely simple construction of the press roll the supporting or carrier members can be springs or can contain springs. These springs can be formed, for instance, from a suitable metal. However, they also can be fluid springs, such as gas and/or liquid springs.

In the case of a constructional design which is suitable for fulfilling greater requirements, there can be provided gas or liquid springs equipped with positioning feelers and regulators actuatable by such positioning feelers for regulating the supporting force.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a longitudinal sectional view through a controlled deflection roll constructed according to the invention;

FIG. 2 is a cross-sectional view of the controlled deflection roll depicted in FIG. 1, taken substantially along the section line II—II thereof;

FIG. 3 is a variant of the controlled deflection roll depicted in FIG. 2 and containing a gas-liquid spring;

FIG. 4 illustrates an exemplary embodiment of a spring of the type shown in FIG. 3 containing a regulator for the regulation of the supporting force;

FIG. 5 is a partial sectional view, corresponding to the showing of FIG. 1, of a different embodiment of the supporting or carrier member equipped with springs;

FIG. 6 is a cross-sectional view of the arrangement of FIG. 5, taken substantially along the section line VI—VI thereof;

FIGS. 7 and 8 illustrate two respectively different possibilities of employing the inventive controlled deflection roll in a rolling mill or device, the showing being in sectional view corresponding to the illustration of FIG. 2; and FIG. 9 is a schematic illustration of the circuitry for the pressure lines of the support or pressure elements of a rolling mill containing controlled deflection rolls constructed according to the invention.

DETAILED DESCRIPTION OF THE PREFERRED EMBODIMENTS

Describing now the drawings, it is to be understood that only enough of the construction of the various embodiments of controlled deflection rolls has been depicted in the drawings as will enable those skilled in this art to readily understand the underlying principles and concepts of the present development, while simplifying the illustration. Turning attention now specifically to FIG. 1 there is shown therein a controlled deflection roll W which is here assumed to be of the type known from the aforementioned U.S. Pat. Nos. 3,885,283 and 3,802,044, to which reference may be readily had. This controlled deflection roll W contains a stationary roll support or beam 1, the ends of which are mounted and secured against rotation in side elements or plates 2 of a here not further illustrated conventional frame arrangement or roll stand. A roll shell or jacket 3 is mounted in appropriate known fashion to be rotatable about the stationary roll support or beam 1. This rotatable roll shell 3 is supported upon hydrostatic support or pressure elements 4. As clearly described in the aforementioned U.S. Pat. No. 3,802,044, the support or pressure elements 4 are sealingly guided, however so as to be inclinable, within substantially cylindrical bores 5 and are subjected to the action of a suitable hydraulic pressurised fluid medium, typically pressurised oil, which is infed by a line or conduit 6 into an internal bore or passage 7 of the stationary roll support or beam 1. As also explained in this U.S. Pat. No. 3,802,044 there is provided, in addition to the hydrostatic supporting of the rotatable roll shell or jacket 3 upon the piston-like support or pressure elements 4, also a hydrostatic lubrication between the running or contact surfaces of the support or pressure elements 4 and the inner surface of the roll shell 3. For this purpose the running or contact surfaces of the support elements 4 are provided with hydrostatic bearing pockets 8 or equivalent structure which are flow connected by throttle bores 10 with the pressure space or chamber of the related cylinder 5. Here also as to this mode of operation reference may be again made to such U.S. Pat. No. 3,802,044.

On the other hand, as is known from the likewise previously mentioned U.S. Pat. No. 3,885,283, suitable anti-friction bearings, such as the roller bearings 11 are arranged at the opposed ends of the rotatable roll shell or jacket 3. Guide bushings or elements 12 are mounted in such roller bearings 11. As particularly evident by inspecting FIG. 2, each guide bushing or element 12 is provided with an elongate opening or slot 13 which is bounded by substantially flat side walls or surfaces 14. The stationary roll support or beam 1, in turn, is provided with substantially parallel flat guide surfaces 15 which are guided with slight play between the guide walls or surfaces 14 of the related guide bushing or element 12. As also will be readily evident by referring to FIG. 2, the rotatable roll shell or jacket 3 is displaceable in this manner in relation to the stationary roll support or beam 1 in the press or pressure plane E within a mobility range or region which results from the difference of the respective dimensions B and A of the opening 13 in the guide element 12 and the stationary roll support 1 at the same location. As apparent from the illustration of FIGS. 1 and 2 the controlled deflection roll W cooperates with a further roll 16.

According to the teachings of the present invention, with the controlled deflection roll W according to the illustration of FIGS. 1 and 2 there is arranged between the guide element or bushing 12 and the stationary roll support 1 a spring member 20 which serves as a supporting or carrier member. The spring characteristic of the spring member 20 is chosen such that within the aforementioned mobility range it takes-up the weight of the rotatable roll shell 3 and parts which are possibly movable along therewith. Such type of movable parts can be constituted by parts or elements such as, for instance, the roller bearings 11 which are fixedly connected with the rotatable roll shell 3, but however also can consist of the hydraulic support pistons or support elements 4 if, for instance, such are downwardly directed in the press or pressure plane E. Finally, there also can be supported other parts at the rotatable roll shell 3, such as for instance the coacting roll 16. The expression "within the mobility range or region" means, in this connection, that with unactuated, forceless support or pressure elements 4 the rotatable roll shell 3 is floatingly supported upon the spring members or springs 20 in such a manner that the end surfaces M and N of the opening 13 at the guide element 12 and the stationary roll support 1 do not contact one another.

FIGS. 3 and 4 respectively illustrate constructional embodiments in sectional view, corresponding to the illustration of the arrangement of FIG. 2, wherein, however, here each metallic spring 20 is replaced by a related hydraulic-pneumatic spring arrangement i.e. a fluid spring.

Thus, with the embodiment of FIGS. 3 and 4 substantially cylindrical bores or cylinders 29 are formed in the stationary roll support or beam 1. In the cylindrical bores 29 there are sealingly guided piston members or pistons 30 which bear against the upper end surface M of the related guide bushing or element 12. The cylindrical bore 29 is connected by means of a line or conduit 31 with a shutoff element 32 at a not particularly illustrated source of hydraulic pressurised fluid medium. Connected with the line or conduit 31 is a pressure container or reservoir 33 which, in the illustrated exemplary embodiment, contains a gas chamber or space 34.

The apparatus illustrated in FIG. 3 functions in the same manner as the springs 20 of the controlled deflection roll discussed above in conjunction with the embodiment of FIGS. 1 and 2, with the exception however that the spring characteristic can be set or regulated by the selection of the hydraulic pressure in the line or conduit 31 and the size of the volume of the gas space 34. Under circumstances, this gas space 34 can be completely omitted, so that there is only utilized the elasticity of the liquid located in the parts 31 and 33.

The embodiment of FIG. 4 corresponds essentially to that of FIG. 3, so that as a matter of convenience there have been generally used the same reference characters to denote the same or analogous components. With the embodiment of FIG. 4, however, the shutoff element 32 is provided with a servomotor 35 which is actuated by a positioning feeler or sensor 36 which is secured at the guide element or bushing 12 and at the stationary roll support or beam 1. The positioning feeler 36 and the servomotor 35 ensure that the stationary roll support or beam 1 is at least approximately always located in the same position within the opening 13 of the related guide element or bushing 12.

FIGS. 5 and 6 illustrate in conjunction with FIG. 9 a further possibility of arranging the supporting or carrier members for taking-up the inherent weight of the roll shell and possibly further parts. According to these FIGS. 5, 6 and 9 there are formed bores 40 or equivalent passages in the stationary roll support or beam 1. Substantially piston-like supporting or carrier members 41 are guided in these bores 40 and are supported in such bores upon springs 42. The supporting or carrier members 41 contain running or travel surfaces 43 which slide upon the inner surface of the roll shell or jacket 3. In this case the lubrication is accomplished hydrodynamically, which is rendered possible by virtue of the fact that the supporting forces of the supporting or carrier members 41 are appreciably smaller than the pressing forces of the support or pressure elements 4.

From the illustration of FIG. 9 it will be apparent that the supporting or carrier members 41 can be arranged at the end regions of the related rotatable roll shell or jacket 3. However, it is to be also understood that a number of supporting or carrier members 41 can be distributively arranged throughout the length of the rotatable roll shell 3. The supporting or carrier members 41 also can be combined, for instance, with the support springs 20 or the support arrangements shown in FIGS. 5 and 6.

FIGS. 7 and 8 depict possibilities of using the inventive controlled deflection roll W in rolling mills containing two rolls according to the aforementioned U.S. Pat. Nos. 3,885,283 and 3,802,044.

Thus, according to FIG. 7 there are provided two inventively constructed controlled deflection rolls W, the springs 20 of which in each case support the inherent weight of the related rotatable roll shell 3.

According to the arrangement of FIG. 8 only the upper roll is constructed as a controlled deflection roll W according to the teachings of the invention, wherein the weight of the rotatable roll shell 3 and, in this case, also the weight of the downwardly directed support or pressure elements 4 are carried by the springs or spring members 20. The lower roll is a standard roll constructed according to the teachings of the aforementioned U.S. patents. If the support or pressure elements 4 of such lower roll are not actuated, then the rotatable roll shell 3 is lowered upon the stationary roll support or beam 1 in such a manner that the aforementioned surfaces M and N of the guide element or bushing 12 and the stationary roll support 1 come to bear against one another.

Finally, FIG. 9 shows in conjunction with a simplified schematic illustration the connection of the support or pressure elements 4 serving for forming the press or pressure force, with an arrangement of the type depicted in FIGS. 3 or 4. As will be apparent from such FIG. 9, the support or pressure elements 4 of both rolls, the upper roll and equally the lower roll, are connected in each case with the same pressure line or conduit 50, and specifically in a manner such that the upper support elements 4 and the lower support elements 4 exert the same press or pressure forces. There are thus not needed any regulation devices for taking into account the inherent weight of the rotatable roll shell and the movable parts, since such inherent weight is taken-up by the supporting or carrier members, in this case the supporting or carrier members 41.

In the arrangement of FIG. 9 there have been depicted three pressure lines or conduits 50 for the purpose of possibly forming zones, and as to such three pressure lines 50 each can contain a different pressure. There can be provided a larger number of such pressure lines 50 or only a single such pressure line, at which then there are connected all of the support or pressure elements 4. Also, during the formation of zones, i.e. in the case of a plurality of pressure lines 50, each zone has more than only two support or pressure elements 4, which for purposes of simplifying the illustration of the drawing of FIG. 9 have only been shown as containing two such support or pressure elements 4 for each pressure zone.

The support elements of the type disclosed in U.S. Pat. No. 3,802,044 have only been illustrated herein as an exemplary construction of the support elements and not by way of limitation. Therefore, it should be clearly understood that also other constructions of support or pressure elements can be provided for forming the press or pressing force, provided that they allow for the requisite displaceability of the rotatable roll shell 3 in relation to the stationary roll support 1 in the press or pressure plane E.

For reasons of simplicity in illustration the springs 20 have been illustrated as helical springs. Here also it should be expressly understood that in lieu thereof there also can be advantageously employed other types of springs, such as plate springs and so forth. The supporting or carrier members also can be arranged externally of the rotatable roll shell. What is important is that they are interposed between the stationary roll support or beam and the rotatable roll shell or jacket.

While there are shown and described present preferred embodiments of the invention, it is to be distinctly understood that the invention is not limited thereto, but may be otherwise variously embodied and practiced within the scope of the following claims. Accordingly,

What I claim is:

1. A controlled deflection roll comprising:
    a stationary roll support;
    a rotatable roll shell mounted to be rotatable about said stationary roll support;
    support elements for supporting said rotatable roll shell upon said stationary roll support;
    means for enabling displacement of the rotatable roll shell in relation to the stationary roll support in a press plane within a predetermined mobility range;
    supporting members interposed between the stationary roll support and the rotatable roll shell; and
    said supporting members serving for continuously taking-up the inherent weight of the rotatable roll shell and parts of the roll movable in conjunction with the rotatable roll shell within the mobility range of the rotatable roll shell in relation to the stationary roll support at least during operation of the controlled deflection roll.

2. The controlled deflection roll as defined in claim 1, wherein:
    said supporting members comprise springs.

3. The controlled deflection roll as defined in claim 2, wherein:
    said supporting members comprise at least gas springs.

4. The controlled deflection roll as defined in claim 2, wherein:
    said supporting members comprise at least liquid springs.

5. The controlled deflection roll as defined in claim 2, wherein:
    said supporting members comprise gas and liquid springs.

6. The controlled deflection roll as defined in claim 2, wherein:
    said supporting members comprise fluid springs.

7. The controlled deflection roll as defined in claim 6, further including:
    positioning feelers provided for said supporting members; and
    regulator means actuatable by said positioning feelers for regulating a continuous supporting force exerted by said supporting members.

8. The controlled deflection roll as defined in claim 1, wherein:
    said supporting members comprise elastic supporting members.

9. The controlled deflection roll as defined in claim 8, wherein:
   said elastic supporting members and said support elements are effective in a common direction.

10. The controlled deflection roll as defined in claim 8, wherein:
    said elastic supporting members and said support elements are effective in opposite directions.

11. The controlled deflection roll as defined in claim 1, wherein:
    said controlled deflection roll cooperates with a counter-roll during operation of said controlled deflection roll;

said roll shell of said controlled deflection roll being capable of being lifted off and out of coacting relationship with said counter-roll during idle phases of said controlled deflection roll; and said supporting members serving for continuously taking-up the inherent weight of the rotatable roll shell and of parts of the controlled deflection roll movable in conjunction with the rotatable roll shell within the mobility range of the rotatable roll shell in relation to the stationary roll support both during said operation of said controlled deflection roll in coacting relationship with said counter-roll and during lift-off of the rotatable roll shell of the controlled deflection roll away from said counter-roll.

* * * * *